May 13, 1969   J. R. W. HALE   3,443,828
ARTICULATED CONNECTOR
Filed Dec. 15, 1966

JESSE R.W. HALE
INVENTOR.

BY *Lyon&Lyon*

ATTORNEYS

United States Patent Office 3,443,828
Patented May 13, 1969

3,443,828
ARTICULATED CONNECTOR
Jesse R. W. Hale, Gardena, Calif., assignor to General Connectors Corporation, Burbank, Calif., a corporation of California
Filed Dec. 15, 1966, Ser. No. 602,090
Int. Cl. F16l *27/04;* F16c *9/06, 23/00*
U.S. Cl. 285—266                               6 Claims

ABSTRACT OF THE DISCLOSURE

An articulated connector for joining sections of a conduit in which a pair of journal rings of channel cross section confront opposite sides of a seal ring, the radially inner portions of the journal rings defining a cylinder to receive the cylindrical end of one conduit, the radially outer portions defining a sphere to fit within a sleeve defining a spherical wall.

Summary of the invention

This invention relates to articulated connectors and included in the objects of this invention are:

First, to provide an articulated connector for conduits wherein a pair of confronting conduits are connected by a sleeve, having an internal spherically contoured recess disposed over each conduit; each recess receiving a pair of novelly constructed journal rings, their outer sides defining a spherical contour and their inner sides being cylindrical to fit said conduits; each pair of journal rings being separated by a seal ring engaging both the corresponding conduit and recess.

Second, to provide an articulated connector for conduits wherein only a single seal ring is required between each conduit and the connector.

Third, to provide an articulated connector which permits not only relative angular displacement of the conduits, but also permits limited parallel or lateral displacement.

Fourth, to provide an articulated connector which, except for the seal rings, may be formed of sheet metal of simple contour, thereby providing a light weight, inexpensive, yet dependable articulated connector.

With the above and other objects in view, as may appear hereinafter, reference is directed to the accompanying drawings in which.

Figure 1:
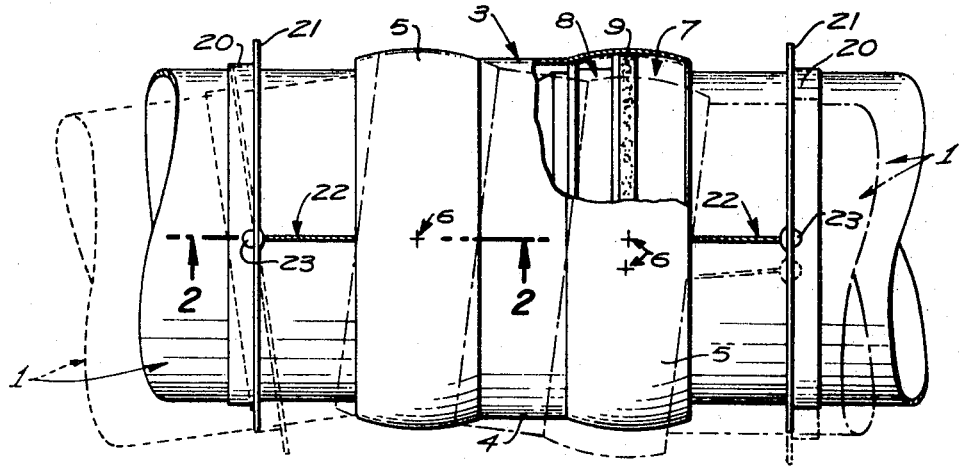
FIGURE 1 is a side view of the articulated connector, with a portion broken away to illustrate the internal construction, and showing a pair of conduits, fragmentarily. Still further, one conduit being indicated by dotted lines in an angular position, and the other conduit and the connector being shown by broken lines in an offset position.
Figure 2:
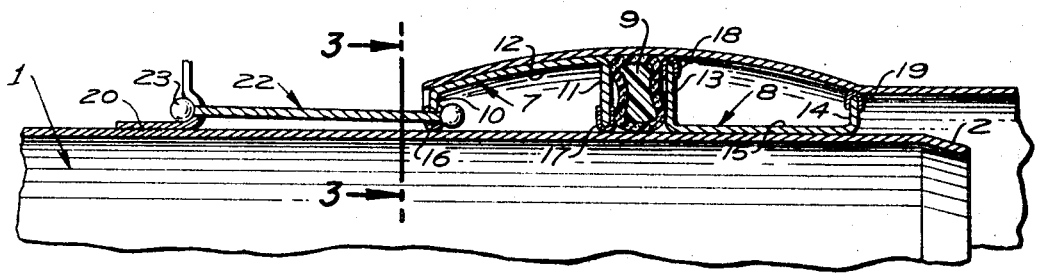
FIGURE 2 is an enlarged fragmentary sectional view, taken through 2—2 of FIGURE 1.
Figure 3:
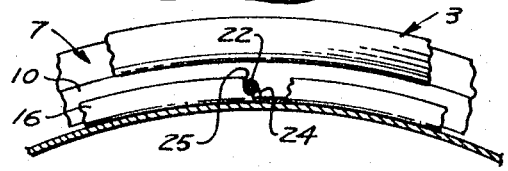
FIGURE 3 is a fragmentary sectional view, taken through 3—3 of FIGURE 2.
Figure 4:
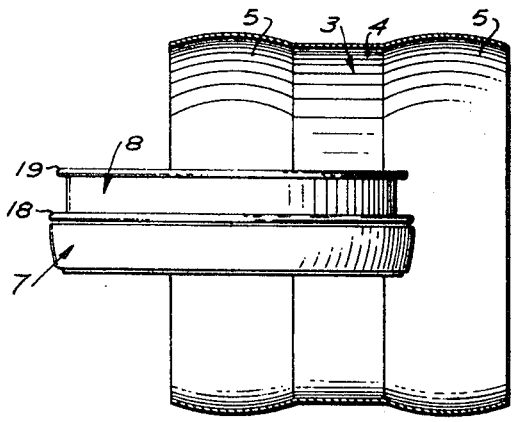
FIGURE 4 is a reduced view, showing the connector sleeve in section and a pair of journals in elevation to indicate the manner in which the journal rings are assembled in the connector sleeve.

The articulated connector is intended, primarily, to join a pair of conduits 1 to each other or to connect a single conduit to a bulkhead or other structure. The conduits are formed of relatively thin sheet metal, and to facilitate assembly of the connector thereon, their extremities have rudimentary inturned or conical flanges 2.

The articulated connector includes a sleeve 3, formed of sheet material. The sleeve includes a cylindrical midportion 4, slightly larger than the diameter of the conduit, and end portions 5 in the form of spherical zones; that is, internally the end portions form recesses of spherical contour, each recess having a center designated 6 located midway between the axial extremities of the recess.

Each spherical end portion receives an axially outer journal ring 7 and an axially inner journal ring 8, which are separated by a seal ring 9. The seal ring provides a slidable, but sealing, contact with the conduit 1 and with the inner surface of the end portion 5.

The journal rings are channel shaped in cross section, preferably one ring defines a radially outwardly directed channel, the other ring defines a radially inwardly directed channel. For purposes of illustration, the axially outer journal ring is indicated as having a radially inwardly directed channel, and therefore, includes radially inwardly directed end flanges 10 and 11, and a spherically contoured web 12. The axially inner journal ring is provided with radially outwardly directed end flanges 13 and 14, and a cylindrical connecting web 15.

Each of the flanges 10, 11, 13, and 14 is capped by a corresponding bearing ring 16, 17, 18, and 19, respectively. Except for dimensional differences to accommodate the corresponding flanges, the bearing rings are similar. The material comprising the bearing rings varies with the type of service for which the connector is designed. For example, the bearing rings may be formed of copper alloy, having good bearing properties, or may be formed of plastic material, such as Teflon. The bearing rings are U-shaped in cross section, forming a channel of sufficient width to receive an end flange. If the bearing rings are formed of plastic material, they may be continuous or if formed from extruded stock, may be split. Similarly, if the bearing rings are formed of metal, they may be split.

In some installations, it is desirable to anchor the axially outer journal rings 7, with respect to the conduits. For this purpose, one or each conduit is provided with an anchor band 20, welded or otherwise secured thereto, in spaced relation to the journal ring 7. The anchor band is provided with a radially outwardly extending flange 21, which is notched at equally spaced points, to receive a set of cables 22, or other linking elements which are provided with enlarged ends 23. The axially outer flange 10 of each journal ring 7, is provided with a set of notches 24, and the corresponding bearing ring 16 may be similarly notched, as indicated by 24, to receive the other ends of the cables 22.

The dimensions of the spherical end portions 5 and the journal rings 7 and 8, are such that when the seal ring 9 is omitted, the two journal rings may be placed in contact with each other, and positioned initially at 90° to the spherical end portion 5, as shown in FIGURE 5, and then inserted into the spherical end portion, after which the journal rings are turned to their proper position, and spread apart to receive the seal ring. In this regard a clearance fit is not necessary, but merely that the interference fit be such that none of the parts is stressed beyond its elastic limit.

Operation of the articulated connector is as follows:

Once assembled, each conduit may be pivoted about the corresponding center 6. The total angular displacement is therefore twice the range of angular displacement of each conduit. Furthermore, by reason of the fact that the two centers 6 are axially displaced, either conduit may be displaced laterally, with respect to the other conduit. The angular and lateral displacements are indicated by broken lines in FIGURE 1. It will therefore be seen that the connector permits relatively wide latitude and angular or lateral positioning of the conduits. It will also be noted that all of the parts are relatively simple contour and therefore easily fabricated.

While a particular embodiment of this invention has been shown and described, it is not intended to limit the same to the details of the construction set forth.

I claim:
1. A connector adapted to fit the end of a cylindrical conduit, said connector comprising:
 (a) a sleeve having an internal annular recess at one end defining a spherical surface.
 (b) a pair of journal rings within said recess, each journal ring being channel shaped in cross section and including radially extending end flanges and a connecting web, the radially outer surfaces of said journal rings defining a common spherical surface conforming to the internal contour of said recess; the radially inner surfaces of said journal rings conforming to the cylindrical surface of said conduit;
 (c) and a seal ring separating said journal rings and sealingly engaging both said conduit and said sleeve within said recess.

2. A connector, as defined in claim 1, wherein:
 (a) the flanges of one of said journal rings extend radially outward and the connecting web is cylindrical;
 (b) and the flanges of the other of said journal rings extend radially inward and the connecting web defines a spherical surface.

3. A connector, as defined in claim 1, wherein:
 (a) bearing rings cap the extremities of said flanges.

4. A connector for joining a pair of confronting cylindrical conduits, said connector comprising:
 (a) a sleeve including, adjacent each end, an internal annular recess defining a spherical surface, the centers of said spherical surfaces being axially separated;
 (b) a pair of journal rings within each recess, each journal ring being channel shaped in cross section and including radially extending end flanges and a connecting web, the radially outer surfaces of said journal rings defining a common spherical surface conforming to the internal contour of the corresponding recess for movement about the pivot center thereof; the radially inner surfaces of said journal rings conforming to the cylindrical surface of the corresponding conduit;
 (c) and a seal ring separating each pair of said journal rings and sealingly engaging both the corresponding conduit and the sleeve within the corresponding recess.

5. A connector, as defined in claim 4, wherein:
 (a) the flanges of one journal ring of each pair extend radially outward and the connecting web is cylindrical;
 (b) the flanges of the other journal ring of each pair extend radially inward and the connecting web defines a spherical surface.

6. A connector, as defined in claim 4, wherein:
 (a) bearing rings cap the extremities of said flanges.

References Cited

UNITED STATES PATENTS

| 1,001,842 | 8/1911 | Greenfield | 285—266 |
| 1,223,645 | 4/1917 | Van Epps | 285—266 X |
| 1,795,155 | 3/1931 | White | 285—266 X |
| 2,085,922 | 7/1937 | Moore | 285—266 |
| 2,286,565 | 6/1942 | Norton | 285—266 |
| 3,206,229 | 9/1965 | Kramer | 285—114 |

FOREIGN PATENTS 24,548   6/1906   Austria.

THOMAS F. CALLAGHAN, *Primary Examiner.*

U.S. Cl. X.R.

285—114; 308—72